(12) United States Patent
Murphy et al.

(10) Patent No.: US 6,406,381 B2
(45) Date of Patent: *Jun. 18, 2002

(54) COMPOSITE GOLF CLUB HEAD AND METHOD OF MANUFACTURING

(75) Inventors: James M. Murphy, Laguna Nigel; Herbert Reyes, Oceanside; D. Clayton Evans, San Marcos; J. Andrew Galloway, Escondido; Richard C. Helmstetter, Rancho Santa Fe; Daniel R. Jacobson, San Diego, all of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/752,406

(22) Filed: Dec. 29, 2000

Related U.S. Application Data

(63) Continuation of application No. 09/474,670, filed on Dec. 29, 1999, now Pat. No. 6,248,025, which is a continuation-in-part of application No. 08/958,723, filed on Oct. 23, 1997, now Pat. No. 6,010,411.

(51) Int. Cl.$^7$ .............................................. A63B 53/04
(52) U.S. Cl. ....................................... 473/345; 473/348
(58) Field of Search ........................ 473/324, 345–349, 473/342

(56) References Cited

U.S. PATENT DOCUMENTS

| | | |
|---|---|---|
| 1,658,581 A | 2/1928 | Tobia |
| 4,496,153 A | 1/1985 | Kochevar |
| 4,502,687 A | 3/1985 | Kochevar |
| 4,575,447 A * | 3/1986 | Hariguchi |
| 4,667,963 A | 5/1987 | Toneyama |
| 4,778,722 A | 10/1988 | Yamamure et al. |
| 4,793,616 A | 12/1988 | Fernandez |
| 4,874,171 A | 10/1989 | Ezaki et al. |
| 5,009,425 A | 4/1991 | Okumoto et al. |
| 5,190,290 A | 3/1993 | Take |
| 5,228,964 A | 7/1993 | Okumoto |
| 5,242,168 A | 9/1993 | Aizawa |
| 5,262,118 A | 11/1993 | Fukushima et al. |
| 5,318,296 A | 6/1994 | Adams et al. |
| 5,350,556 A | 9/1994 | Abe |
| 5,377,986 A | 1/1995 | Viollaz et al. |
| 5,429,365 A | 7/1995 | McKeighton |
| 5,485,998 A * | 1/1996 | Kobayashi |
| 5,489,098 A | 2/1996 | Gojny et al. |
| 5,533,728 A | 7/1996 | Pehoski |
| 5,547,427 A * | 8/1996 | Rigal |
| 5,593,356 A | 1/1997 | Takeda |
| 5,672,120 A | 9/1997 | Ramirez |
| 5,674,133 A | 10/1997 | Chang |
| 5,779,560 A | 7/1998 | Buck |
| 5,985,197 A * | 11/1999 | Nelson |
| 5,989,134 A | 11/1999 | Antonious |
| 6,102,813 A * | 8/2000 | Dill |
| 6,165,081 A * | 12/2000 | Chou |

FOREIGN PATENT DOCUMENTS

GB 2 292 332 A 4/1994

\* cited by examiner

Primary Examiner—Stephen Blau
(74) Attorney, Agent, or Firm—Michael A. Catania

(57) ABSTRACT

A golf club having a club head with a striking plate composed of a composite material and having a thickness in the range of 0.010 to 0.250 inches is disclosed herein. The golf club head also has a coefficient of restitution greater than 0.8 under test conditions such as the USGA test conditions specified pursuant to Rule 4-1e, Appendix II, of the Rules of Golf for 1998–1999. The golf club head body is also composed of a composite material, and a weight strip is placed within a ribbon of the body.

8 Claims, 10 Drawing Sheets

COMPOSITE GOLF CLUB HEAD AND METHOD OF MANUFACTURING

CROSS REFERENCES TO RELATED APPLICATIONS

This application is a continuation application of U.S. Pat. application Ser. No. 09/474,670, filed Dec. 29, 1999, now U.S. Pat. No. 6,248,025, which is a continuation-in-part application of U.S. Pat. No. 6,010,411, application Ser. No. 08/958,723, filed on Oct. 23, 1997, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to a golf club head with a striking plate composed of a composite material. More specifically, the present invention relates to a golf club head composed of composite material with specifically oriented sheets for a more efficient transfer energy to a golf ball at impact.

2. Description of the Related Art

When a golf club head strikes a golf ball, large impacts are produced that load the club head face and the golf ball. Most of the energy is transferred from the head to the golf ball, however, some energy is lost as a result of the collision. The golf ball is typically composed of polymer cover materials (such as ionomers) surrounding a rubber-like core. These softer polymer materials having damping (loss) properties that are strain and strain rate dependent which are on the order of 10–100 times larger than the damping properties of a metallic club striking plate. Thus, during impact most of the energy is lost as a result of the high stresses and deformations of the golf ball (0.001 to 0.20 inches), as opposed to the small deformations of the metallic club face (0.025 to 0.050 inches). A more efficient energy transfer from the club head to the golf ball could lead to greater flight distances of the golf ball.

The generally accepted approach has been to increase the stiffness of the club head face to reduce metal or club head deformations. However, this leads to greater deformations in the golf ball, and thus increases in the energy transfer problem.

Some have recognized the problem and disclosed possible solutions. An example is Campau, U.S. Pat. No. 4,398,965, for a Method Of Making Iron Golf Clubs With Flexible Impact Surface, which discloses a club having a flexible and resilient face plate with a slot to allow for the flexing of the face plate. The face plate of Campau is composed of a ferrous material, such as stainless steel, and has a thickness in the range of 0.1 inches to 0.125 inches.

Another example is Eggiman, U.S. Pat. No. 5,863,261, for a Golf Club Head With Elastically Deforming Face And Back Plates, which discloses the use of a plurality of plates that act in concert to create a spring-like effect on a golf ball during impact. A fluid is disposed between at least two of the plates to act as a viscous coupler.

Yet another example is Jepson et al, U.S. Pat. No. 3,937,474, for a golf Club With A Polyurethane Insert. Jepson discloses that the polyurethane insert has a hardness between 40 and 75 shore D.

Still another example is Inamori, U.S. Pat. No. 3,975,023, for a Golf Club Head With Ceramic Face Plate, which discloses using a face plate composed of a ceramic material having a high energy transfer coefficient, although ceramics are usually harder materials. Chen et al., U.S. Pat. No. 5,743,813 for a Golf Club Head, discloses using multiple layers in the face to absorb the shock of the golf ball. One of the materials is a non-metal material.

Lu, U.S. Pat. No. 5,499,814, for a Hollow Club Head With Deflecting Insert Face Plate, discloses a reinforcing element composed of a plastic or aluminum alloy that allows for minor deflecting of the face plate which has a thickness ranging from 0.01 to 0.30 inches for a variety of materials including stainless steel, titanium, KEVLAR®, and the like. Yet another Campau invention, U.S. Pat. No. 3,989,248, for a Golf Club Having Insert Capable Of Elastic Flexing, discloses a wood club composed of wood with a metal insert.

The Rules of Golf, established and interpreted by the United States Golf Association ("USGA") and The Royal and Ancient Golf Club of Saint Andrews, set forth certain requirements for a golf club head. The requirements for a golf club head are found in Rule 4 and Appendix II. A complete description of the Rules of Golf are available on the USGA web page at www.usga.org. Although the Rules of Golf do not expressly state specific parameters for a golf club face, Rule 4-1e prohibits the face from having the effect at impact of a spring with a golf ball. In 1998, the USGA adopted a test procedure pursuant to Rule 4-1e which measures club face COR. This USGA test procedure, as well as procedures like it, may be used to measure club face COR.

Although the prior art has disclosed many variations of striking plate plates, the prior art has failed to provide a face with a high coefficient of restitution composed of a thin material.

BRIEF SUMMARY OF THE INVENTION

The present invention provides a golf club head with a striking plate having a high coefficient of restitution in order to increase the post-impact velocity of a golf ball for a given pre-impact club head velocity. The present invention is able to accomplish this by using a striking plate composed of a thin composite material.

One aspect of the present invention is a golf club head having a striking plate composed of a composite material, having a thickness in the range of 0.010 inches to 0.250 inches, and having a coefficient of restitution of at least 0.83 under test conditions, such as those specified by the USGA. The standard USGA conditions for measuring the coefficient of restitution is set forth in the *USGA Procedure for Measuring the Velocity Ratio of a Club Head for Conformance to Rule 4-1e, Appendix II. Revision I, Aug. 4, 1998 and Revision 0, Jul. 6, 1998*, available from the USGA.

Another aspect of the present invention is a golf club head including body composed of a composite material. The body has a crown, a striking plate, a sole, a ribbon, a toe end and a heel end. The golf club head has a coefficient of restitution greater than 0.83 under standard test conditions. The composite material is plies of pre-preg sheets having specific orientations. The body also has a return with a specific thickness to allow for greater compliance of the striking plate.

Yet another aspect of the present invention is a method for producing a golf club head composed of a composite material. The method includes placing plies of pre-preg sheets in a mold to form a preform. Each of the plies has a quasi-isotropic orientation. The preform, with a bladder therein, is then cured to create the composite golf club head.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
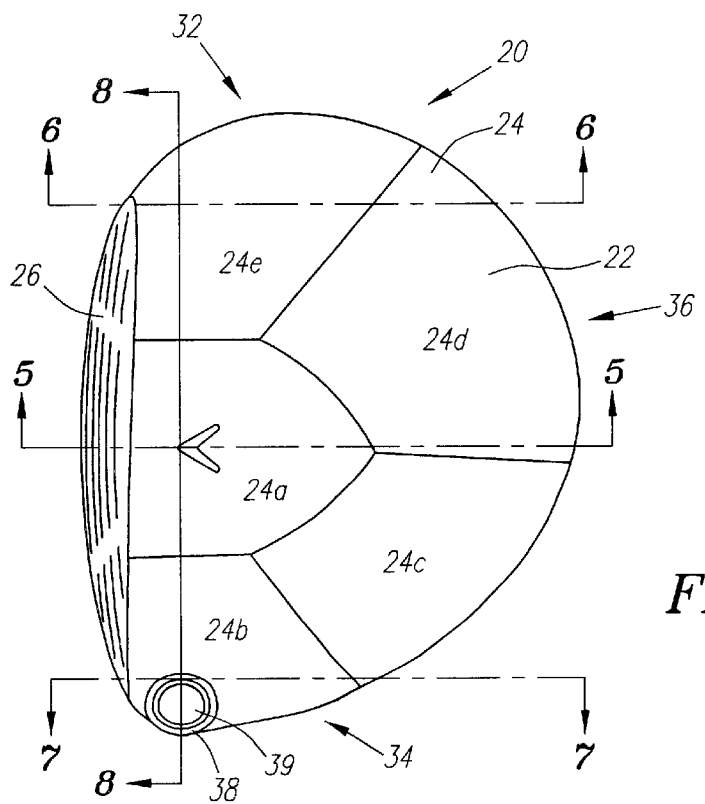
FIG. 1 is a top plan view of a golf club head of the present invention.
Figure 2:
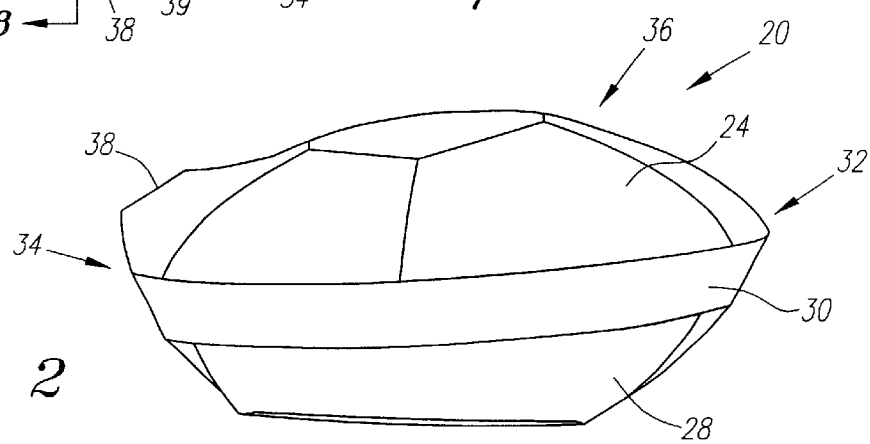
FIG. 2 is a rear view of the golf club head of FIG. 1.
Figure 3:
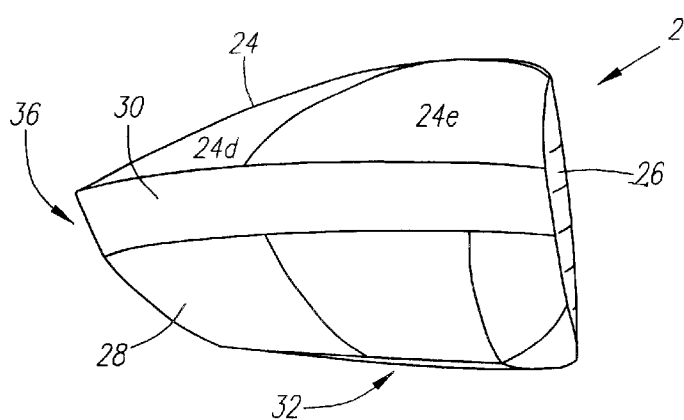
FIG. 3 is a toe end view of the golf club head of FIG. 1.
Figure 4:
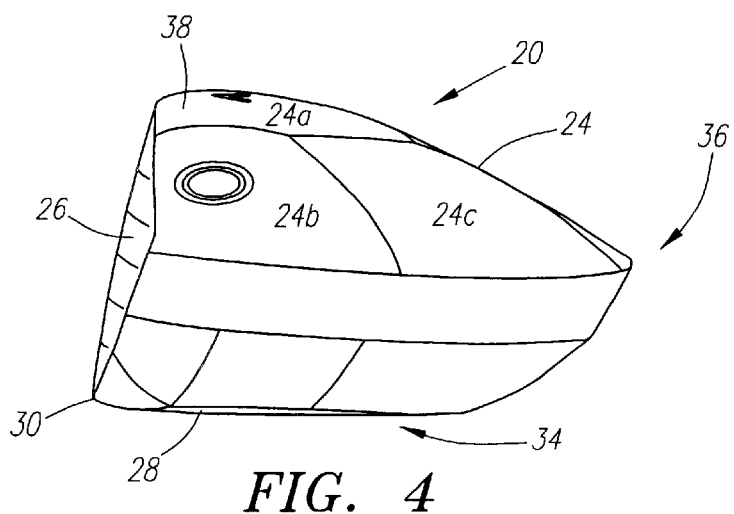
FIG. 4 is a heel end view of the golf club head of FIG. 1.

The present invention is directed at a golf club head having a striking plate that is thin and has a high coefficient of restitution thereby enabling for greater distance of a golf ball hit with the golf club head of the present invention. The coefficient of restitution (also referred to herein as "COR") is determined by the following equation:

$$e = \frac{v_2 - v_1}{U_1 - U_2}$$

wherein $U_1$ is the club head velocity prior to impact; $U_2$ is the golf ball velocity prior to impact which is zero; $v_1$ is the club head velocity just after separation of the golf ball from the striking plate of the club head; $v_2$ is the golf ball velocity just after separation of the golf ball from the striking plate of the club head; and e is the coefficient of restitution between the golf ball and the club striking plate.

The values of e are limited between zero and 1.0 for systems with no energy addition. The coefficient of restitution, e, for a material such as a soft clay or putty would be near zero, while for a perfectly elastic material, where no energy is lost as a result of deformation, the value of e would be 1.0. The present invention provides a club head having a striking plate or face with a coefficient of restitution approaching 0.9, as measured under conventional test conditions.

As shown in FIGS. 1–4, a golf club head of the present invention is generally designated 20. The club head 20 may be a fairway wood or a driver. The club head 20 has a body 22 that is generally composed of a composite material such as plies of carbon pre-peg sheets. The body 22 has a crown 24, a striking plate 26, a sole 28 and a ribbon 30 juxtaposed by the sole 28 and the crown 24. The ribbon 30 generally extends from a toe end 32 to a heel end 34. The ribbon 30 generally begins at one end of the striking plate 26 and ends at an opposite end of the striking plate 26. A rear 36 of the body 22 is opposite the striking plate 26 and is defined by portions of the ribbon 30, the crown 24 and the sole 28. Also, at the heel end 34 of the club head 20 is a hosel 38 with an opening 39 for placement of a shaft therein.

The ribbon 30 increases the volume of the club head 20 and also assists in creating a club head 20 with a higher moment of inertia. The ribbon 30 also provides for a flatter crown 24 or crown 24 with a lesser radius of curvature than the crown of a traditional wood club head such as the GREAT BIG BERTHA® driver available from Callaway Golf Company of Carlsbad, Calif. As shown in FIG. 1, the crown may be partitioned into sections 24a–24e. A crown central section 24a is the flattest section having little or no curvature. A crown hosel section 24b is downwardly convex toward the hosel 38. Crown rear sections 24c and 24d are downwardly convex toward the ribbon 30, as is crown toe section 24e.

Figure 5:
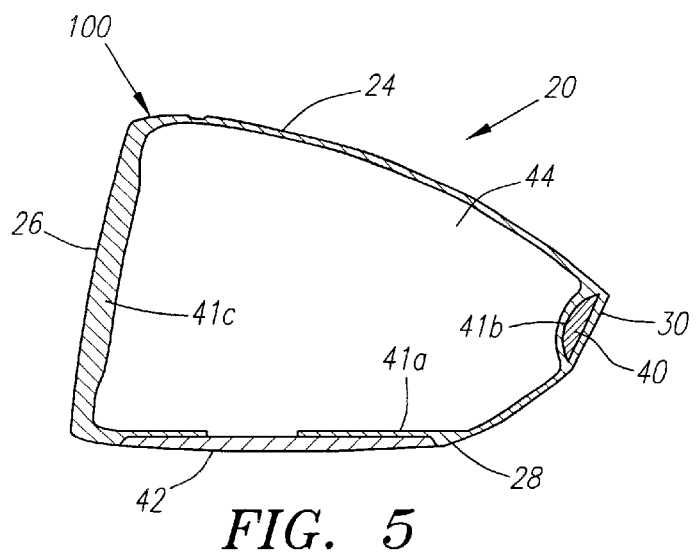
FIG. 5 is a cross-sectional view of the golf club head of FIG. 1 along line 5—5.
Figure 6:
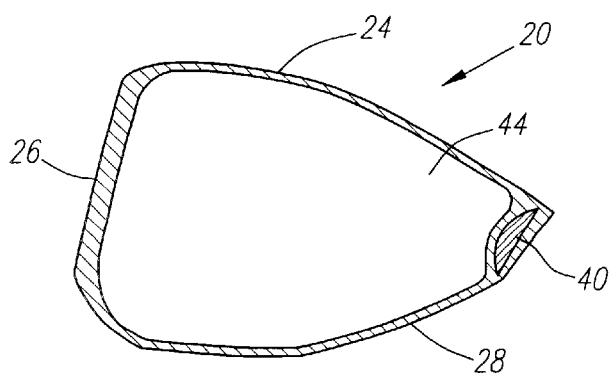
FIG. 6 is a cross-sectional view of the golf club head of FIG. 1 along line 6—6.
Figure 7:
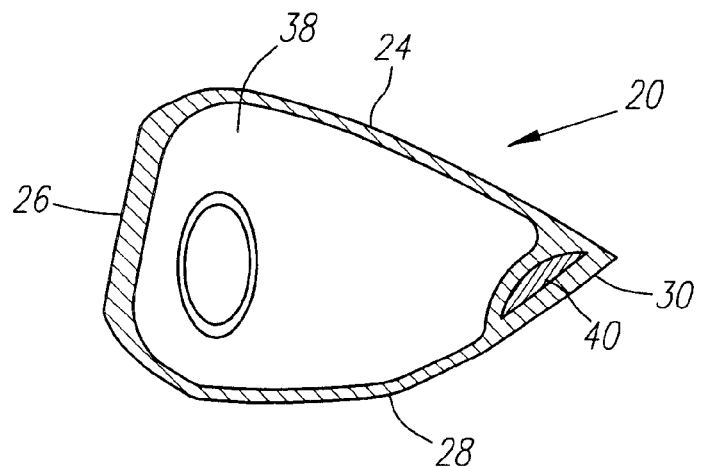
FIG. 7 is a cross-sectional view of the golf club head of FIG. 1 along line 7—7.

As shown in FIGS. 5–8, the club head has a weight strip 40 disposed in the ribbon 30 of the club head 20. The weight strip 40 is preferably embedded within layers of the plies of pre-peg 41a–b. The weight strip 40 is further described in co-pending U.S. patent application Ser. No. 09/474,688, filed Dec. 29, 1999, and entitled A Composite Golf Club Head With An Integral Weight Strip, which is hereby incorporated in its entirety. A sole plate 42 is attached to the sole 28 of the body 22. Also, as shown in FIG. 5, a return 100 is a transition area from the striking plate 26 to the crown 24. The return 100 has a predetermined thickness ranging from 0.100 inches to 0.200 inches to control the compliance of the striking plate 26.

Figure 8:
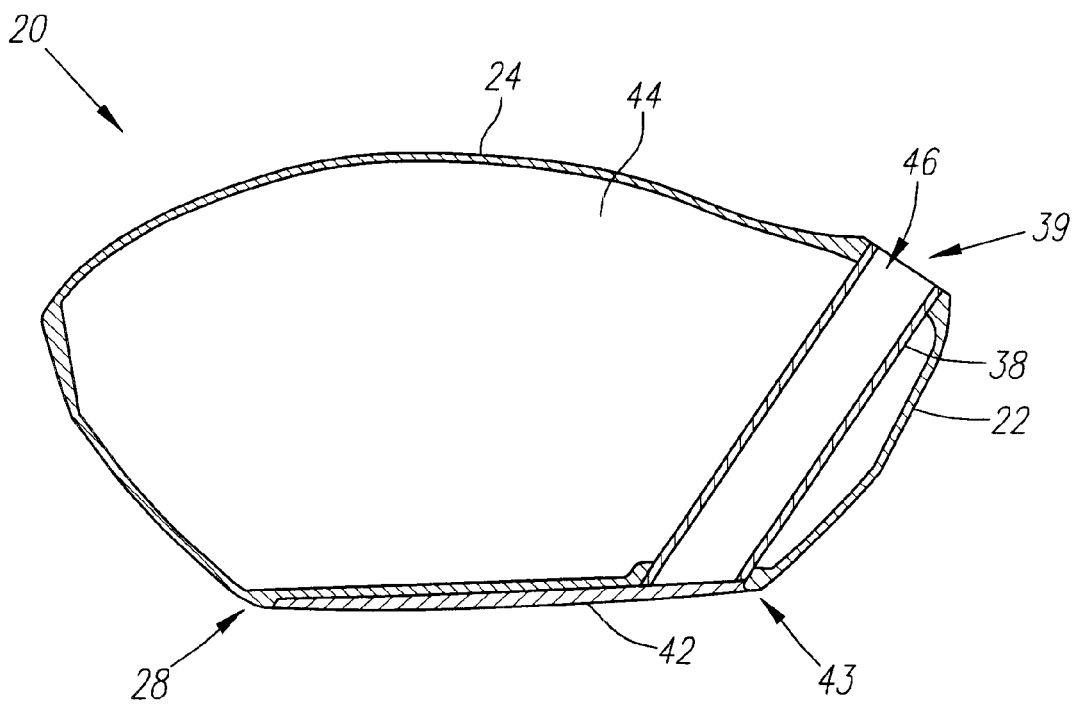
FIG. 8 is a cross-sectional view of the golf club head of FIG. 1 along line 8—8.

As shown in FIG. 8, sole plate 42 may be integral with the hosel 38 forming a sole plate hosel integral piece 43 that is incorporated into the club head 20. The hosel 38 lies within the hollow interior 44 of the club head 20. Preferably, the club head 20 has a hollow interior 44, however, the light weight of the composite body 22 allows for numerous manipulations in placement of weight, foam, sound enhancing devices and the like within the hollow interior 44.

Figure 9:
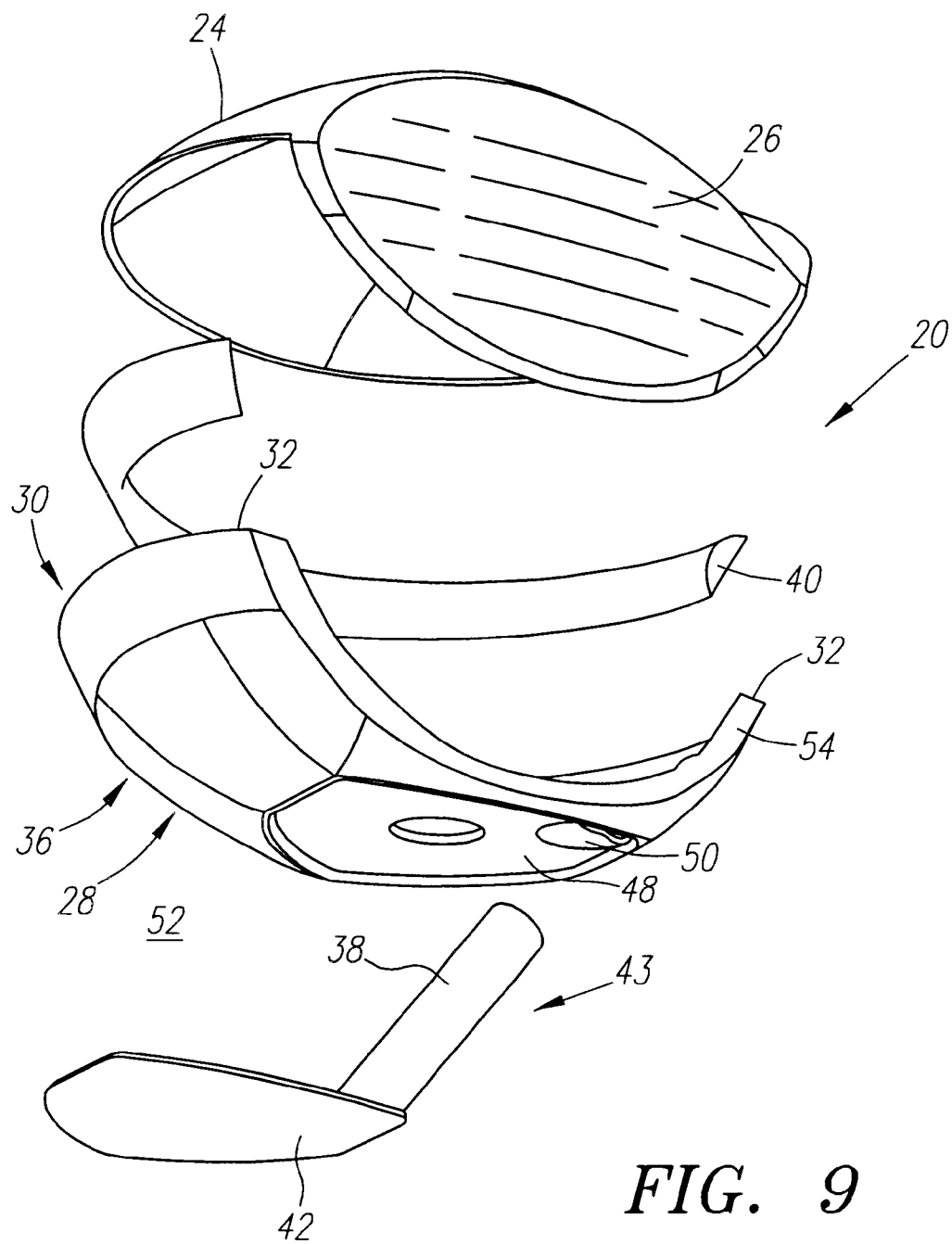
FIG. 9 is an exploded view of the golf club head of the present invention.

As shown in FIG. 9, the sole plate hosel integral piece 43 is inserted into a sole cavity that is shaped to accommodate the sole plate 42. The hosel 38 is inserted through a hosel aperture 50 to connect with the shaft opening 39 for placement of a shaft therethrough. A sole plate aperture 52 allows for access to the hollow interior 44 through the sole 28 which is utilized for fabrication of club head 20 as described below. In a preferred embodiment, the sole plate hosel integral piece 43 is composed of a stainless steel material. The sole plate hosel integral piece 43 is further described in co-pending U.S. patent application Ser. No. 09/474,927, filed Dec. 29, 1999, and entitled Integral Sole Plate And Hosel For A Golf Club Head, which is hereby incorporated in its entirety.

The weight strip 40 is preferably composed of a metal material such as copper, tungsten, steel, aluminum, tin, silver, gold, platinum, or the like. A preferred metal is copper. The weight strip 40 has a density greater than the composite material of the body 22. Preferably, the weight strip 40 extends from approximately the heel end 34 of the striking plate 26 through the rear 36 to the toe end 32 of the striking plate 26. However, the weight strip 40 may only extend along the rear 36 of the ribbon 30, the heel end 34 of the ribbon 30, the toe end 32 of the ribbon 30, or any combination thereof. Preferably, the weight strip 40 occupies the majority of area of the ribbon 30. However, the weight strip 40 may only occupy a small area of the ribbon 30. Alternatively, a densified loaded film may be substituted for the weight strip 40. A description of such a densified loaded film is set forth in co-pending U.S. patent application Ser. No. 08/958,723, filed on Oct. 23, 1997, entitled Densified Loaded Films In Composite Golf Club Heads, which is hereby incorporated in its entirety.

The coefficient of restitution of the club head 20 of the present invention under standard USGA test conditions with a given ball ranges from 0.8 to 0.9, preferably ranges from 0.83 to 0.88 and is most preferably 0.876. The thinness of the striking plate 26 and the orientation of the plies of pre-peg allow the golf club head 20 of the present invention to achieve a coefficient of restitution greater than 0.83. The weight strip 40 and the integrated sole plate and hosel 43 also assist in increasing the coefficient of restitution of the golf club head 20 of the present invention.

Additionally, the thickness of the return 100 of the golf club head 20 allows for a greater deflection in the striking plate 26 which also increases the coefficient of restitution of the golf club head 20. The return 100 couples the striking plate 26 to the crown 24 which reduces the loss of energy to the striking plate 26 during impact with a golf ball. If the return 100 is too thick, the striking plate 26 is isolated and rigid, thereby reducing the coefficient of restitution. If the return 100 is too thin, failure of the striking plate 26 may occur upon impact with a golf ball.

Additionally, the striking plate 26 of the present invention has a smaller aspect ratio than striking plate plates of the prior art. The aspect ratio as used herein is defined as the width, "w", of the striking plate divided by the height, "h", of the striking plate 26, as shown in FIG. 9. In one embodiment, the width w is 90 millimeters and the height h is 54 millimeters giving an aspect ratio of 1.666. In conventional golf club heads, the aspect ratio is usually much greater than 1. For example, the original GREAT BIG BERTHA® driver had an aspect ratio of 1.9. The aspect ratio of the present invention preferably ranges from 1.0 to 1.7.

The club head 20 of the present invention also has a greater volume than a club head of the prior art while maintaining a weight that is substantially lower or equivalent to that of the prior art. The volume of the club head 20 of the present invention ranges from 175 cubic centimeters to 400 cubic centimeters, and more preferably ranges from 300 cubic centimeters to 310 cubic centimeters. The weight of the club head 20 of the present invention ranges from 165 grams to 300 grams, preferably ranges from 175 grams to 225 grams, and most preferably from 188 grams to 195 grams.

Figure 10:
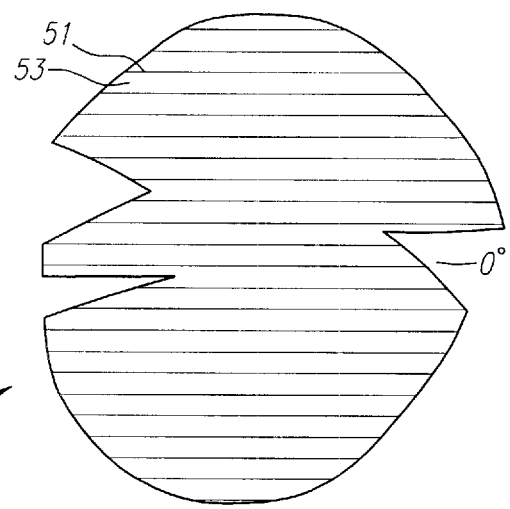
FIG. 10 is a plan view of a striking plate/crown ply having a zero degree orientation.
Figure 11:
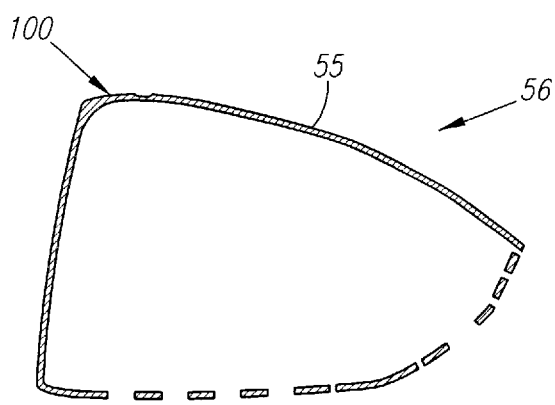
FIG. 11 is a cross-sectional view of a striking plate/crown ply on a golf club head of the present invention.

FIGS. 10–17 illustrate preferred pre-preg sheets for forming the composite body of the golf club head 20 of the present invention. FIGS. 10 and 11 illustrate a face/crown ply pre-preg sheet that is generally designated 55. The face/crown ply 55 has a plurality of fibers 51 dispersed within a resin body 53. The fibers 51 are preferably composed of a carbon material. Alternatively, the fibers 51 may be aramid fibers, glass fibers or the like. The relation of the fibers 51 to the striking plate 26, when the striking plate 26 is in a position to strike a golf ball, determines the orientation of the fibers 51. If the fibers 51 are parallel with the striking plate 26, or in other words extending across from the toe end to the heel end, as shown in FIG. 10, then the face/crown ply 55 has a zero orientation. As shown in FIG. 11, when positioned on a preform 56 of the golf club head body 22, the face/crown ply 55 extends from the rear end 36 of the club head 20 to the bottom of the striking plate 26 and then inward to engage plies of pre-preg sheets for the sole 28.

Figure 12:
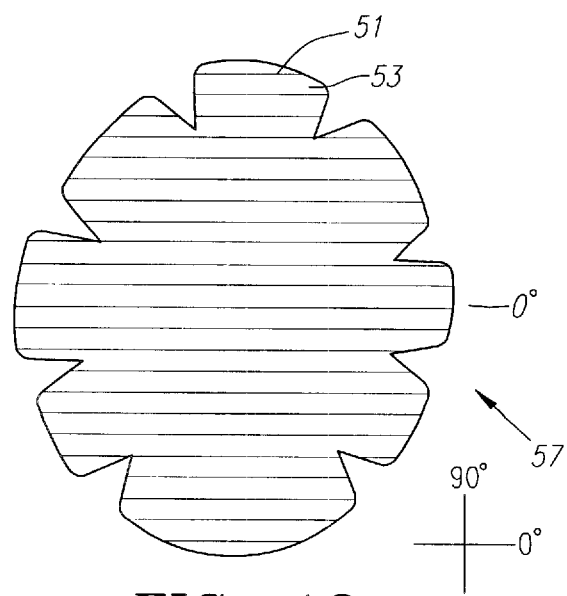
FIG. 12 is a plan view of a full striking plate ply having a zero degree orientation.
Figure 13:
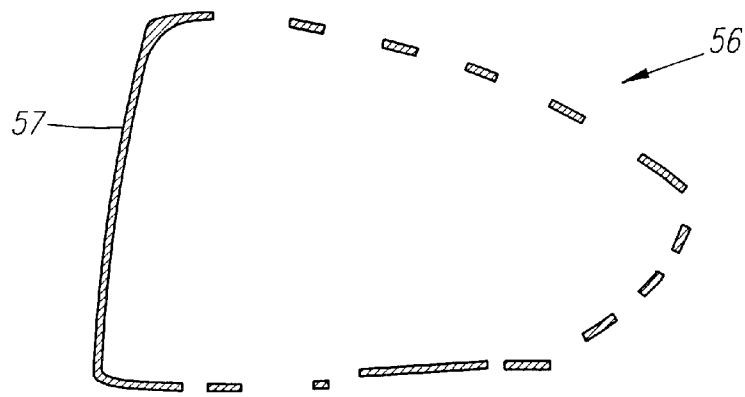
FIG. 13 is a cross-sectional view of a full striking plate ply on a golf club head of the present invention.

FIGS. 12 and 13 illustrate a full face ply pre-preg sheet that is generally designated 57. As with the face/crown ply 55, the full face ply 57 has a plurality of fibers 51 dispersed within a resin body 53. The fibers 51 extend from the sole 28 to the crown 24, and thus the full face ply 57 has fiber that are perpendicular to the striking plate 26 when it is in a position for striking a golf ball. Therefore, the full face ply 57 of Fig. 12 has a zero degree orientation. As shown in FIG. 13, the full face ply 57 essentially covers the striking plate 26 with extensions to engage the pre-preg sheets of the crown 24 and the sole 28.

Figure 14:
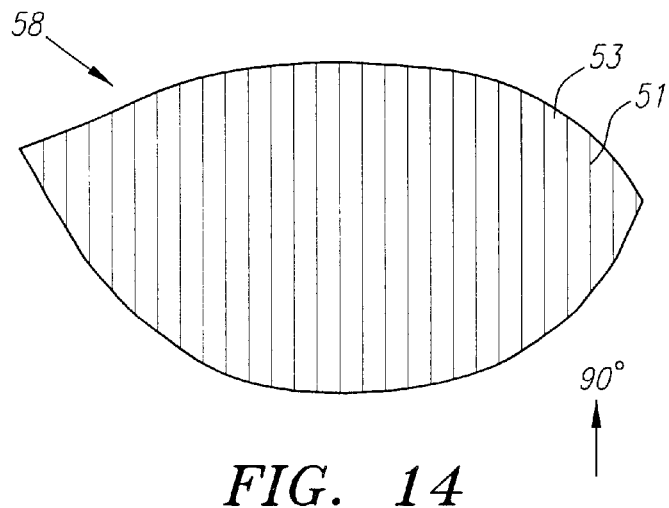
FIG. 14 is a plan view of a striking plate doubler ply having a ninety degree orientation.
Figure 15:
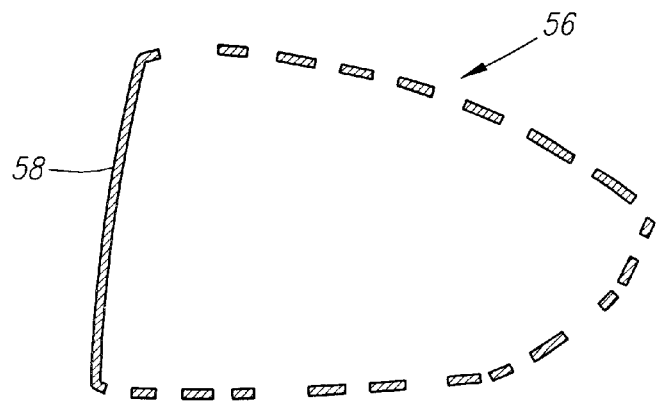
FIG. 15 is a cross-sectional view of a striking plate doubler ply on a golf club head of the present invention.

FIGS. 14 and 15 illustrate a face doubler ply pre-preg sheet that is generally designated 58. As with the face/crown ply 55, the face doubler ply 58 has a plurality of fibers 51 dispersed within a resin body 53. The fibers 51 extend from the sole 28 to the crown 24, and thus the face doubler ply 58 has fibers 51 that are perpendicular to the striking plate 26 when it is in a position for striking a golf ball. Therefore, the face doubler ply 58 of FIG. 14 has a ninety degree orientation. As shown in FIG. 15, the face doubler ply 58 essentially covers the striking plate 26 and is used in conjunction with a full face ply 57, a face/crown ply 55, or both.

Figure 16:
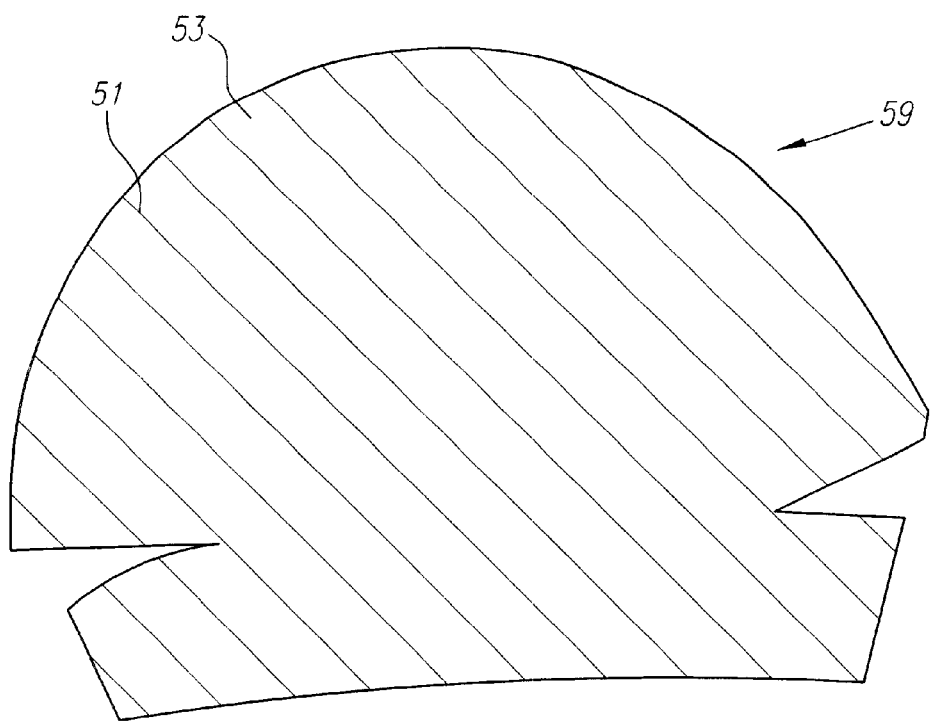
FIG. 16 is a plan view of a sole ply having a forty-five degree orientation.
Figure 17:
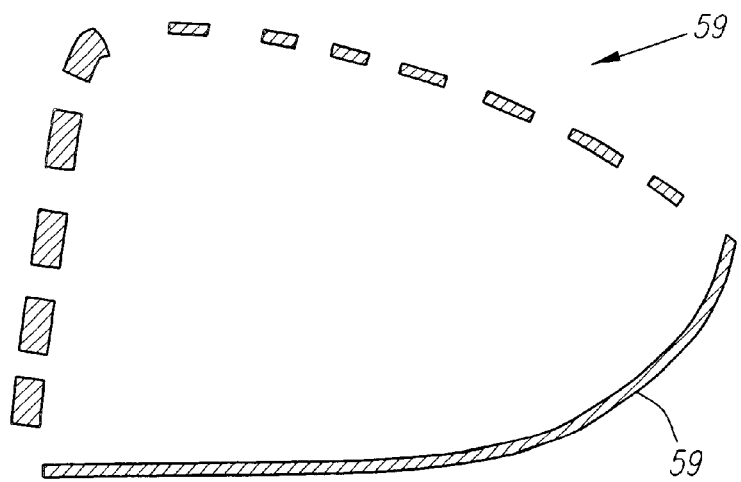
FIG. 17 is a cross-sectional view of a sole ply on a golf club head of the present invention.

FIGS. 16 and 17 illustrate a sole ply pre-preg sheet that is generally designated 59. As with the face/crown ply 55, the sole ply 59 has a plurality of fibers 51 dispersed within a resin body 53. The fibers 51 extend at a forty-five degree angle relative to the striking plate 26 when it is in a position for striking a golf ball. Therefore, the sole ply 59 of FIG. 16 has a forty-five degree orientation. As shown in FIG. 17, the sole ply 59 defines the sole 28 and the ribbon 30.

As previously stated, the preferred composite material is plies of carbon pre-peg sheets. Plies of pre-preg composite sheets are manufactured by pulling strands of fiber in a parallel motion, preferably carbon, aramid or glass fiber, through a resin film and allowing the resin to partially cure or "stage". When the resin is partially staged, the resin holds the fibers together such that the fibers form a malleable sheet with all of the fibers in a specific orientation relative to an edge of the sheet. Preferred orientations are zero degrees, plus forty-five degrees, minus forty-five degrees and ninety degrees. Exemplary carbon pre-preg fiber sheets may be obtained from Newport Composites of Santa Ana, Calif., Fiberite Inc. of Greenville, Tex., or Hexcel Inc. of Pleasonton, Calif. Alternatively, the layers of the composite body 22 may comprise a plurality of plies of composite fiber without any resin, each typically comprising a continuous fiber braid or mat, that are used to make a dry reinforcement preform, as described in co-pending U.S. patent application Ser. No. 08/958,723, filed on Oct. 23, 1997, which is hereby incorporated by reference in its entirety.

Figure 18:
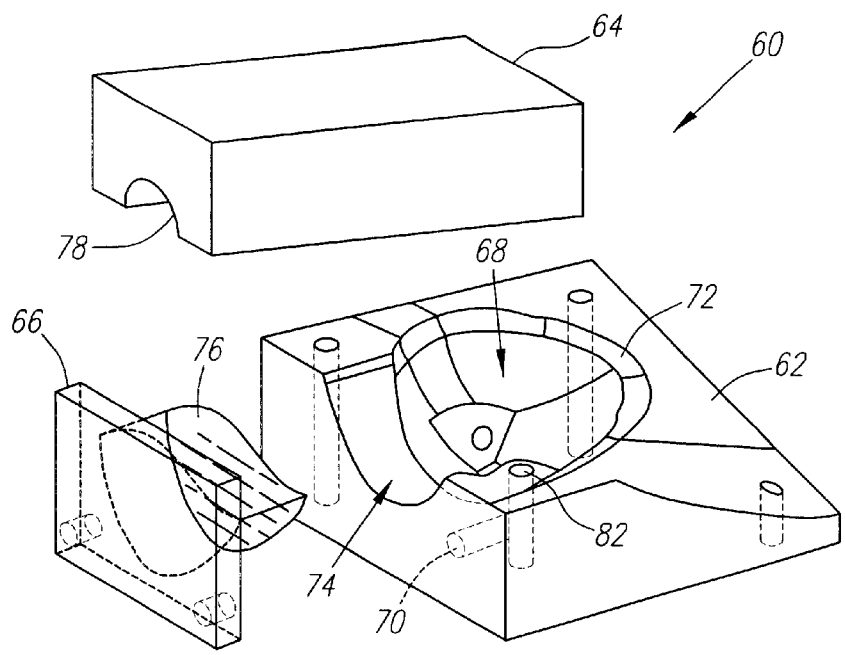
FIG. 18 is an exploded view of a multiple piece mold utilized to produce a golf club head of the present invention.
Figure 19:
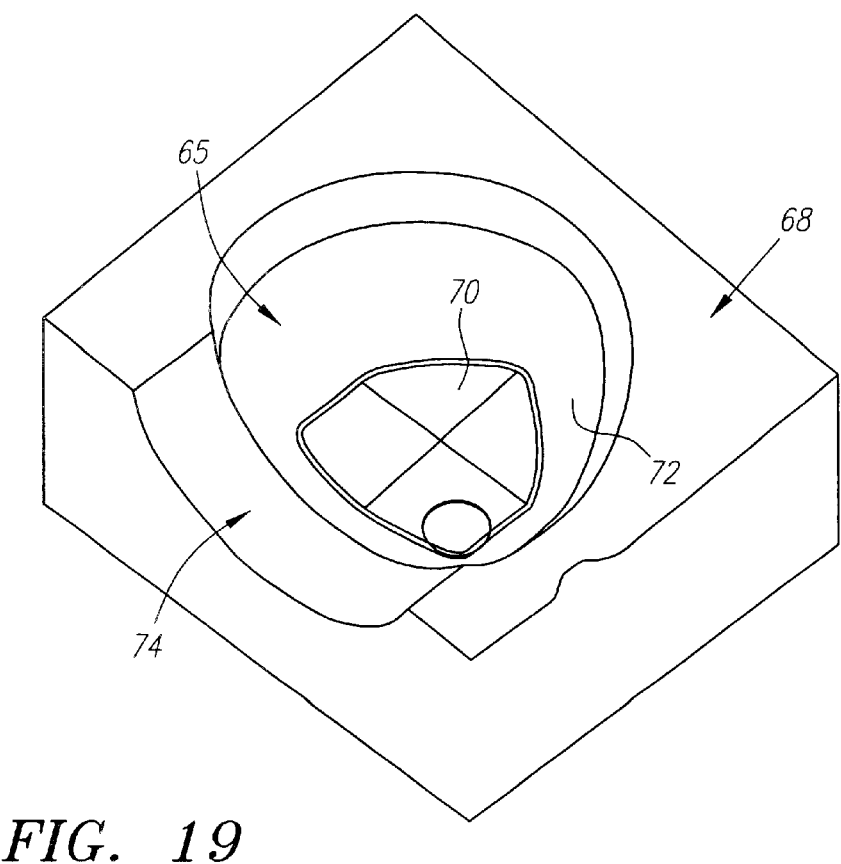
FIG. 19 is an isolated view of the sole piece of the mold of FIG. 18.

A forming mold for the golf club head 20 may be male or female, although female forming molds are presently preferred. As shown in FIG. 18, the mold 60 is composed of three pieces, a sole piece 62, a crown piece 64 and a face piece 66, which are brought together during the molding process. The face piece 66 may be attached to the crown piece 64 prior to placement of the plies thereon. The sole piece 62 has a main cavity 68 with a sole plate bulge 70 and a ribbon section 72. The sole piece 62 also has a front opening 74. The face piece 66 has a face projection 76 that is placed in the front opening of the sole piece 62. The crown piece 64 has a crown cavity 78. The sole piece 62 also has a bladder port 82.

The plies of pre-preg sheets 55, 57, 58 and 59, and if desired a weight strip 40 are applied to the forming mold 60 in a predetermined manner to create a preform 56. The layers of plies of pre-peg sheets 55, 57, 58 and 59 are first applied to predetermined locations on the forming mold 60. The weight strip 40 is then placed within the ribbon section 72 of the sole piece 62. Then, additional sole plies 59 are applied over the weight strip 40, thereby resulting in the weight strip being embedded in the ribbon 30 of the composite body 22 of the preform 56.

Alternatively, additional sole plies 59 are not placed over the weight strip 40, resulting in the weight strip 40 having one surface co-cured to the interior wall of the ribbon 30 of the body 22, and another surface exposed to the hollow interior 44. The face/crown plies 55, full face plies 57 and face doubler plies 58 are placed over the face bulge 76 and the crown cavity 78.

Because the golf club head 20 comprises a substantially enclosed composite body 22 having a hollow core 44, it may be necessary to make a preform 56 in two or more separate pieces or sections, which may be assembled and cured into a finished golf club head 20.

Figure 20:
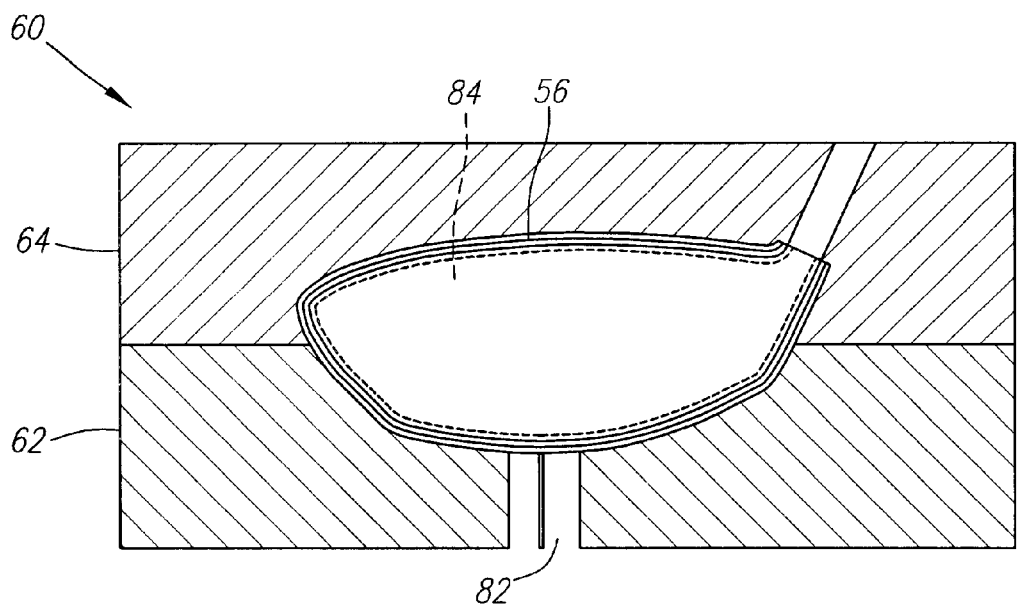
FIG. 20 is a front cross-sectional view of a preform for a golf club head of the present invention in a mold.
Figure 21:
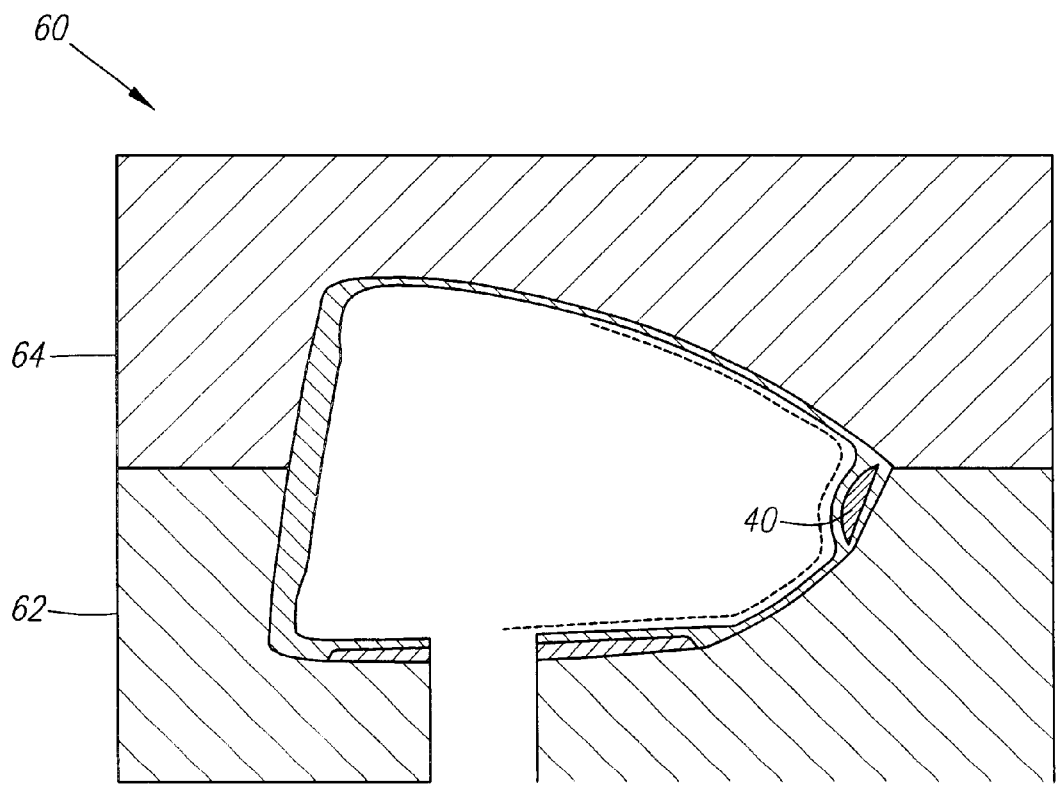
FIG. 21 is a side cross-sectional view of a preform for a golf club head of the present invention in a mold.
Figure 22:
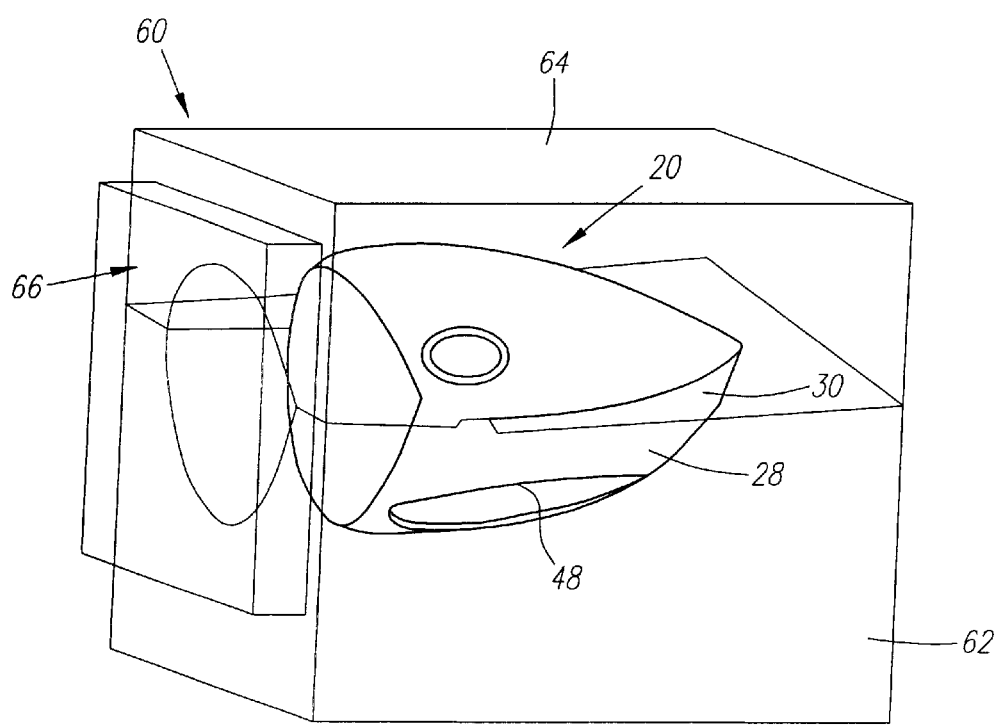
FIG. 22 is a view of a cured golf club head of the present invention within a mold.

As shown in FIGS. 20–22, once the pieces of the mold 60 are assembled together, an inflatable bladder 90, preferably made from latex, silicone, or similar materials, may be introduced into the hollow core 44, through the port opening 82. The resulting opening 52 of the golf club head 20 is covered by the integral hosel and sole plate 43. Once the bladder 90 has been positioned within the hollow core 44 of the preform, a source of pressurized gas (not shown) may be attached by a gas line to the bladder 90, and the bladder 90 may be inflated within the hollow core 44. The bladder 90 thereby engages the inside surface of the preform 56, forcing the plies of pre-preg sheets 55, 57, 58 and 59 and the weight strip 40 against the inner wall of the mold 60. The mold 60 may then be heated at a predetermined temperature for a selected period of time, i.e., a time sufficient to allow proper curing of the resin within the pre-preg sheets 55, 57, 58 and 59 and weight strip 40. After depressurizing, the bladder 90 may be removed through the port opening 82, and the golf club head 20 may be removed from the mold 60. The finished golf club head 20 within the mold 60 is shown in FIG. 22.

Those skilled in the art will appreciate that, depending upon the type of resin used, curing temperatures may range from 250° to 800° F., the requisite curing time may range from a few minutes (for example, in the case of a "quick cure" epoxy or a thermoplastic resin) to 1.5 hours, and the pressure applied via the latex or silicone bladder 90 may range from 100 to 300 psi.

In a first example, the striking plate 26 and crown 24 of the body 22 is composed of 19 full face plies 57 and 8 face/crown plies 55 in a quasi-isotropic orientation. A quasi-isotropic orientation is defined as beginning at a zero degree orientation and rotating angles in at least fifteen degree intervals. Preferably, the orientations are zero degrees, plus forty-five degrees, minus forty-five degrees, and ninety degrees. The sole 28 and ribbon 30 of the body 22 are composed of eight sole plies 59 and a weight strip 40 in a quasi-isotropic orientation. The striking plate 26 of this example has a thickness of 0.117 inches, a return 100 thickness of 0.117 inches, and a coefficient of restitution of 0.876.

In a second example, the striking plate 26 and crown 24 of the body 22 are composed of nineteen full face plies 57, eight face/crown plies 55 and two face doubler plies 58, all in quasi-isotropic orientations. The sole 28 and ribbon 30 of the body 22 are composed of eight sole plies 59 and a weight strip 40 in a quasi-isotropic orientation. The striking plate 26 of this example has a thickness of 0.122 inches, a return 100 thickness of 0.117 inches, and a coefficient of restitution of 0.863.

In a third example, the striking plate 26 and crown 24 of the body 22 are composed of twenty-six full face plies 57, eight face/crown plies 55 and six face doubler plies 58 all in quasi-isotropic orientations. The sole 28 and ribbon 30 of the body 22 are composed of eight sole plies 59 and a weight strip 40 in a quasi-isotropic orientation. The striking plate 26 of this example has a thickness of 0.140 inches, a return 100 thickness of 0.120 inches, and a coefficient of restitution of 0.851.

In a fourth example, the striking plate 26 and crown 24 of the body 22 are composed of nineteen full face plies 57, eight face/crown plies 55 and ten face doubler plies 58 all in quasi-isotropic orientations. The sole 28 and ribbon 30 of the body 22 are composed of eight sole plies 59 and a weight strip 40 in a quasi-isotropic orientation. The striking plate 26 of this example has a thickness of 0.152 inches, a return 100 thickness of 0.117 inches, and a coefficient of restitution of 0.834.

In a fifth example, the striking plate 26 and crown 24 of the body 22 are composed of twenty-eight full face plies 57, eight face/crown plies 55 and two face doubler plies 58, all in quasi-isotropic orientations. The sole 28 and ribbon 30 of the body 22 are composed of eight sole plies 59 and a weight strip 40 in a quasi-isotropic orientation. The striking plate 26 of this example has a thickness of 0.135 inches, a return 100 thickness of 0.126 inches, and a coefficient of restitution of 0.851.

The thinness and ply orientation of the striking plate 26 allows for a golf club head 20 having a coefficient of restitution greater than 0.83. However, the golf club head 20 of the present invention also utilizes structure, aspect ratio, and return 100 thinness to achieve a greater coefficient of restitution for a given golf ball under test conditions such as the USGA test conditions specified pursuant to Rule 4-1e, Appendix II of the Rules of Golf for 1998–1999. Thus, unlike a spring, the present invention increases compliance of the striking plate 26 to reduce energy losses to the golf ball at impact, while not adding energy to the system.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf club head comprising:

a sole composed of at least eight sole plies of pre-preg sheets having a zero to forty-five degree orientation;

and a striking plate and crown composed of at least nineteen face/crown plies of pre-preg sheets, the striking plate further composed of at least eight full face piles of pre-preg sheets and at least two face doubler piles of pre-peg sheets, the striking plate having a thickness in the range of 0.010 to 0.250 inch;

wherein the crown, sole and strikng plate define a completely hollow interior and;

wherein the golf club head has a coeffcient of restitution in the range of 0.8 to 0.9.

2. The golf club head according to claim 1 further comprising a return disposed between the striking plate and the crown, and having a thickness in the range of 0.100 to 0.200 inches.

3. The golf club head according to claim 1 further comprising a ribbon and a weight strip composed of a metal material disposed on the ribbon.

4. The golf club head according to claim 1 further comprising an integral hosel and sole plate composed of a metal material attached to the sole.

5. The golf club head according to claim 1 wherein the plies of pre-preg sheets are in a ninety degree orientation.

6. The golf club head according to claim 1 plies of pre-preg sheets are in a forty-five degree orientation.

7. The golf club head according to claim 1 wherein the full face plies and face/crown plies of pre-preg sheets are in a quasi-isotropic orientation.

8. The golf club head according to claim 1 wherein the golf club head has a volume in the range of 300 cubic centimeters to 310 cubic centimeters, and a weight in the range of 100 grams to 195 grams.

* * * * *